US011740820B1

(12) United States Patent
Devarajan et al.

(10) Patent No.: US 11,740,820 B1
(45) Date of Patent: Aug. 29, 2023

(54) BLOCK ALLOCATION METHODS AND SYSTEMS IN A NETWORKED STORAGE ENVIRONMENT

(71) Applicant: NETAPP, INC., San Jose, CA (US)

(72) Inventors: Mathankumar Devarajan, Karur (IN); Girish Hebbale Venkatasubbaiah, Bangalore (IN); Venkateswarlu Tella, Bangalore (IN); Dnyaneshwar Nagorao Pawar, Bangalore (IN); Harsh Tiwari, Kanpur (IN)

(73) Assignee: NETAPP, INC., San Jose, CA (US)

( * ) Notice: Subject to any disclaimer, the term of this patent is extended or adjusted under 35 U.S.C. 154(b) by 0 days.

(21) Appl. No.: 17/742,111

(22) Filed: May 11, 2022

(51) Int. Cl.
*G06F 3/06* (2006.01)

(52) U.S. Cl.
CPC .............. *G06F 3/064* (2013.01); *G06F 3/065* (2013.01); *G06F 3/0607* (2013.01); *G06F 3/067* (2013.01); *G06F 3/0656* (2013.01)

(58) Field of Classification Search
CPC ........ G06F 3/064; G06F 3/0607; G06F 3/065; G06F 3/0656; G06F 3/067
USPC ........................................................ 711/154
See application file for complete search history.

(56) References Cited

U.S. PATENT DOCUMENTS

| 6,978,283 B1 | 12/2005 | Edwards et al. | |
| 7,593,975 B2 | 9/2009 | Edwards et al. | |
| 7,702,870 B2 | 4/2010 | English et al. | |
| 8,886,691 B2 * | 11/2014 | Colgrove | G06F 3/0608 707/820 |
| 11,144,498 B2 | 10/2021 | George et al. | |
| 2005/0187985 A1 | 8/2005 | Edwards et al. | |
| 2007/0168633 A1 | 7/2007 | English et al. | |
| 2013/0086353 A1 * | 4/2013 | Colgrove | G06F 3/0688 711/E12.059 |
| 2013/0346720 A1 * | 12/2013 | Colgrove | G06F 3/0608 711/165 |
| 2014/0258652 A1 * | 9/2014 | Vishniac | G06F 3/0671 711/159 |
| 2020/0285612 A1 | 9/2020 | George et al. | |
| 2020/0341892 A1 * | 10/2020 | Duggal | G06F 3/0652 |
| 2020/0349066 A1 * | 11/2020 | Chinthekindi | G06F 16/1748 |
| 2021/0405882 A1 | 12/2021 | Venkatasubbaiah et al. | |
| 2022/0027314 A1 | 1/2022 | George et al. | |

* cited by examiner

*Primary Examiner* — Than Nguyen

(74) *Attorney, Agent, or Firm* — Loza & Loza, LLP; Tejinder Singh

(57) ABSTRACT

Methods and systems for a storage environment are provided. One method includes identifying, by a processor, a plurality of block numbers of a fragmented address space for re-allocation, each block number associated with data stored by a file system in a storage device of a storage system; determining, by the processor, compressed data associated with a block number from among the plurality of block numbers; verifying, by the processor, that an indirect block of a hierarchical structure maintained by the file system references the block number associated with the compressed data; and copying, by the processor, the compressed data to a new block, without decompressing the data.

20 Claims, 9 Drawing Sheets

BLOCK ALLOCATION METHODS AND SYSTEMS IN A NETWORKED STORAGE ENVIRONMENT

TECHNICAL FIELD

The present disclosure generally relates to networked storage systems, and more particularly, to innovative computing technology for efficiently re-allocating blocks for a de-fragmented file system address space.

BACKGROUND

Various forms of storage systems are used today. These forms include direct attached storage, network attached storage (NAS) systems, storage area networks (SANs), and others. Storage systems are commonly used for a variety of purposes, such as providing multiple users with access to shared data, backing up data and others. A storage system typically includes at least one computing system (may also be referred to as a "server", "storage server", "storage node", "storage system node" or "storage controller") executing a storage operating system configured to store and retrieve data on behalf of one or more computing systems at one or more storage devices. The storage operating system uses an address space to store data at storage devices. The data may be compressed for storage space efficiency. As data gets stored at the storage device, the address space may become fragmented i.e. scattered across the address space, and it is desirable to defragment the address space.

To handle defragmentation, conventional techniques today allocate new blocks for storing data. Typically, to defragment an address space that stores compressed data, conventional systems decompress and then re-compress the data, before the re-compressed data is stored at the newly allocated blocks. The decompression and compression operations use computing resources, which is undesirable. Continuous efforts are being made to improve computing technology for efficiently handling compressed data blocks during block re-allocation of a de-fragmented address space.

BRIEF DESCRIPTION OF THE DRAWINGS

The various features of the present disclosure will now be described with reference to the drawings of the various aspects disclosed herein. In the drawings, the same components may have the same reference numerals. The illustrated aspects are intended to illustrate, but not to limit the present disclosure. The drawings include the following Figures.

DETAILED DESCRIPTION

Figure 1:
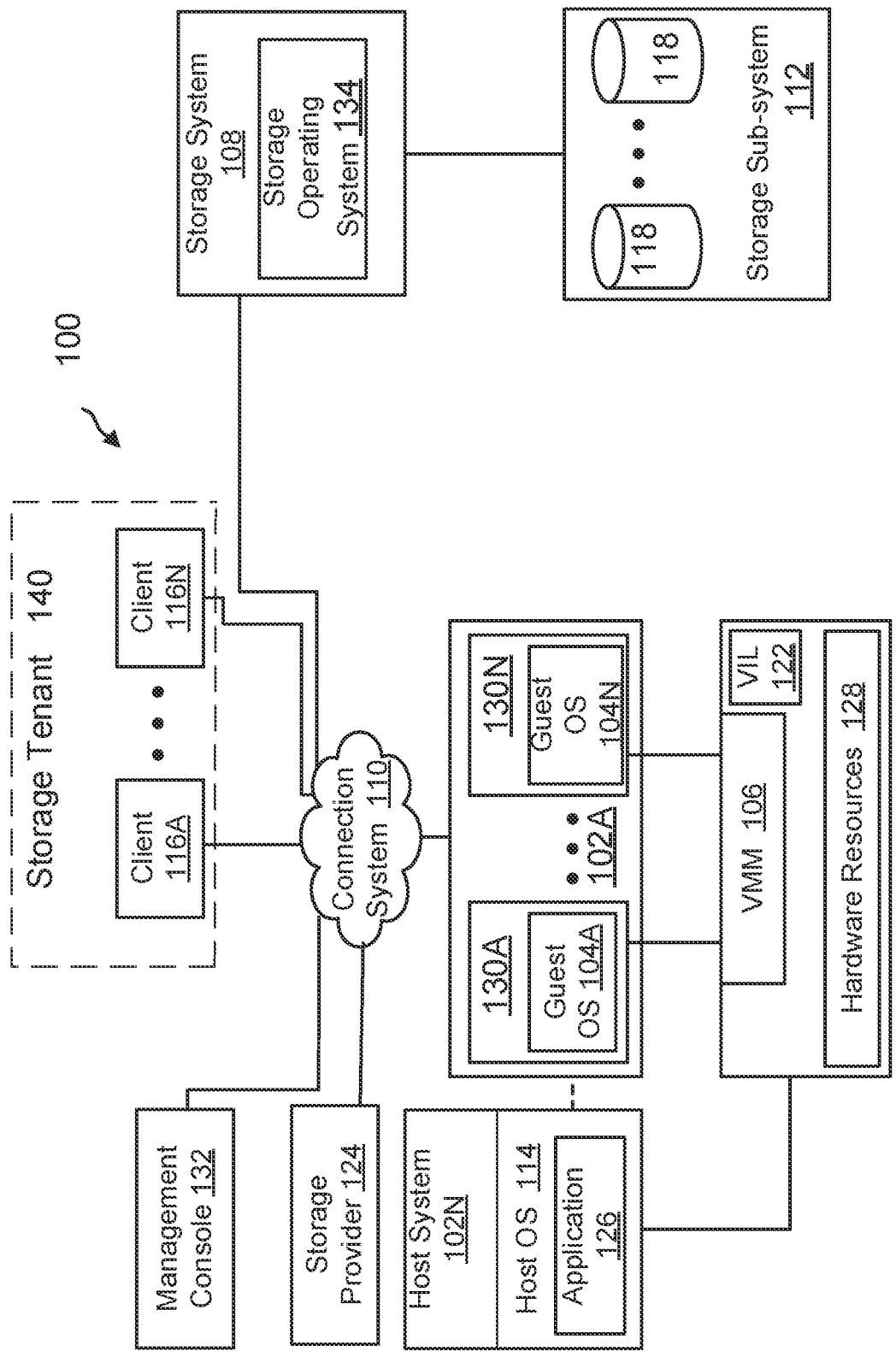
FIG. 1 shows an example of an operating environment for various aspects of the present disclosure.

Before describing, the various aspects of the present disclosure, a brief introduction of some of the structures used by a storage operating system of a storage system having a plurality of storage devices may be helpful. As used herein, the term "file system" generally refers to computer-executable code to perform a storage function that manages data access and may, in the case of the storage system, implement data access semantics of a general-purpose operating system.

As an example, the storage operating system may implement a high-level module, such as the file system (also referred to as file system manager), to logically organize information stored on storage devices as a hierarchical structure of directories, files and blocks. For example, each "on-disk" file may be implemented as set of data structures, i.e., blocks, configured to store information, such as the actual data for the file. These data blocks are organized within a volume block number (VBN) space that is maintained by the file system. The file system may also assign each data block in the file a corresponding "file offset" or a file block number (FBN). The file system typically assigns sequences of FBNs on a per-file basis, whereas VBNs are assigned over a larger volume address space. The file system organizes the data blocks within the VBN space as a "logical volume," described below in detail; each logical volume may be, although is not necessarily, associated with its own file system. The file system typically consists of a contiguous range of VBNs from zero to n, for a file system of size n-1 blocks.

One example of a file system is a write-anywhere file system that does not overwrite data on storage devices. If a data block is retrieved (read) from a storage device into a memory of the storage system and "dirtied" (i.e., updated or modified) with new data, the data block is thereafter stored (written) to a new location to optimize write performance. A write-anywhere file system may initially assume an optimal layout such that the data is substantially contiguously arranged/stored in storage devices. The optimal storage device layout results in efficient access operations, particularly for sequential read operations, directed to the storage devices.

The storage operating system may further implement a storage module, such as a RAID system, that manages storage and retrieval of the information to and from storage devices in accordance with input/output (I/O) operations. The RAID system typically organizes the RAID groups into a "physical" device (i.e., a physical volume), such that the storage blocks are concatenated across storage devices of all RAID groups. The logical volume maintained by the file system is then "disposed over" (spread over) the physical volume maintained by the RAID system.

A file system layout may apportion an underlying physical volume into one or more virtual volumes (VVOLs) of a storage system. The underlying physical volume is an aggregate comprising one or more groups of storage devices, such as RAID groups. The aggregate has its own physical volume block number (PVBN) space and maintains metadata, such as block allocation structures, within that PVBN space. Each VVOL has its own virtual volume block number (VVBN) space and maintains metadata, such as block allocation structures, within that VVBN space. Each VVOL is a file system that is associated with a container file; the container file is a file in the aggregate that contains all blocks used by the VVOL. Moreover, each VVOL comprises data blocks and indirect blocks that contain block pointers that point at either other indirect blocks or data blocks.

In one aspect, innovative technology is disclosed that enables defragmentation of a PVBN space with one or more compressed data extents ("CDEs"), without decompressing and/or compressing the CDE, while maintaining the overall CDE structure. As an example, to store data in blocks, multiple data blocks can be combined in a group, and then the combined group of data can be compressed using a compression algorithm. The compressed data is typically stored in contiguous storage blocks. The storage blocks where the compressed data is stored for a group of blocks is referred to as a CDE. The term extent as used herein means an in-core representation of data blocks of a storage device. The CDE includes a group of extents which are linked together for in-core representation. Both "on-disk" and in-core compression group of blocks/extents are referred to as a CDE, interchangeably throughout this specification.

At a high level, a file system scanner identifies a list of PVBNs that should be reallocated due to fragmentation in the PVBN space. The scanner determines that the list of PVBNs includes one or more CDEs. The innovative process performs a validity check to ensure that L1 blocks (i.e., indirect blocks, described below) of the CDEs are still pointing to the same CDE PVBNs. Composite work items are then generated for each CDE for copying the CDE "as-is" i.e., without decompression. The process obtains one or more buffers for L0 blocks (i.e., data blocks, described below) associated with each CDE PVBNs and the buffers are maintained in an "invalid state." It is noteworthy that the buffers are write allocated in an invalid state, which enables copying the CDEs without decompression. The buffers are then "dirtied" and queued for post processing. The packed CDEs are then processed during a consistency point. The CDE context and structure is maintained during defragmentation.

As a preliminary note, the terms "component", "module", "system," and the like as used herein are intended to refer to a computer-related entity, either software-executing general-purpose processor, hardware, firmware and a combination thereof. For example, a component may be, but is not limited to being, a process running on a hardware processor, a hardware processor, an object, an executable, a thread of execution, a program, and/or a computer.

By way of illustration, both an application running on a server and the server can be a component. One or more components may reside within a process and/or thread of execution, and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Computer executable components can be stored, for example, at non-transitory, computer readable media including, but not limited to, an ASIC (application specific integrated circuit), CD (compact disc), DVD (digital video disk), ROM (read only memory), floppy disk, hard disk, storage class memory, solid state drive, EEPROM (electrically erasable programmable read only memory), memory stick or any other storage device type, in accordance with the claimed subject matter.

System 100

FIG. 1 shows an example of a networked storage environment 100 (also referred to as system 100), for implementing the various adaptive aspect of the present disclosure. System 100 may include a plurality of computing devices 102A-102N (may also be referred to as a "host system 102," "host systems 102", "computing device 102", "computing devices 102", "server 102" or "servers 102") communicably coupled via a connection system 110 (e.g. a local area network (LAN), wide area network (WAN), the Internet and others) to a storage system 108 (may also be referred to as "storage server 108", "storage controller 108", "storage node 108", "storage nodes 108", "storage system node 108" or "storage system nodes 108") that executes a storage operating system 134 for storing and retrieving data to and from a storage subsystem 112 having mass storage devices 118. As used herein, the term "communicably coupled" may refer to a direct connection, a network connection, or other connections to enable communication between devices Although only a single storage system 108 is shown in FIG. 1, according to aspects of the present disclosure, system 100 may include a plurality of storage systems 108.

As an example, host system 102A may execute a plurality of virtual machines (VMs) in a virtual environment that is described below in detail. Host 102N may execute one or more application 126, for example, a database application, an email application or any other application type to use the storage system 108 for storing information in storage devices 118. Host 102N executes an operating system 114, for example, a Windows based operating system, Linux, Unix and others (without any derogation of any third-party trademark rights) to control the overall operations of host 102N.

Clients 116A-116N are computing devices that can access storage space at the storage system 108 via the connection system 110. A client can be the entire system of a company, a department, a project unit or any other entity. Each client is uniquely identified and, optionally, may be a part of a logical structure called a storage tenant 140. The storage tenant 140 represents a set of users (may be referred to as storage consumers) for a storage provider 124 (may also be referred to as a cloud manager, where cloud computing is utilized) that provides access to storage system 108. It is noteworthy that the adaptive aspects of the present disclosure are not limited to using a storage provider or a storage tenant, and instead, may be implemented for direct client access.

In one aspect, the storage operating system 134 has access to the storage devices 118 of the storage subsystem 112. The storage devices 118 may include solid state drives (SSDs), storage class memory, writable storage device media such as hard disk drives (HDD), magnetic disks, video tape, optical, DVD, magnetic tape, and/or any other similar media adapted to store electronic information. The storage devices 118 may be organized as one or more RAID groups. The various aspects disclosed are not limited to any specific storage device type or storage device configuration.

As an example, the storage operating system 134 may provide a set of logical storage volumes (or logical unit numbers (LUNs)) that present storage space to host systems 102, clients 116, and/or VMs (e.g. 130A/130N, described below) for storing information. Each volume may be configured to store data containers (e.g. files, directories, structured or unstructured data, or data objects), scripts, word processing documents, executable programs, and any other type of structured or unstructured data. From the perspective of one of the client systems, each volume can appear to be a single drive. However, each volume can represent storage space at one storage device, an aggregate of some or all of the storage space in multiple storage devices, a RAID group, or any other suitable set of storage space.

An example of storage operating system 134 is the Data ONTAP® storage operating system available from NetApp, Inc. that implements a Write Anywhere File Layout (WAFL®) file system (without derogation of any trademark rights of NetApp Inc.). The various aspects disclosed herein are not limited to any specific file system type and maybe implemented by other file systems and storage operating systems.

The storage operating system 134 organizes storage space at the storage subsystem 112 as one or more "aggregate", where each aggregate is identified by a unique identifier and a location. Within each aggregate, one or more storage volumes are created whose size can be varied. A qtree, sub-volume unit may also be created within the storage volumes. As a special case, a qtree may be an entire storage volume.

The storage system 108 may be used to store and manage information at storage devices 118. A request to store or read data may be based on file-based access protocols, for example, the Common Internet File System (CIFS) protocol or Network File System (NFS) protocol, over TCP/IP (Transmission Control Protocol/Internet Protocol). Alternatively, the request may use block-based access protocols, for example, iSCSI (Internet Small Computer Systems Interface) and SCSI encapsulated over Fibre Channel (FCP). The term file/files as used herein include data container/data containers, directory/directories, and/or data object/data objects with structured or unstructured data.

To facilitate access to storage space, as mentioned above, the storage operating system 134 implements a file system (also referred to as file system manager 240, FIG. 2) that logically organizes stored information as a hierarchical structure for files/directories/objects at the storage devices 118, as described above. The storage operating system 134 may further implement a storage module (for example, a RAID system for the storage subsystem 112) that manages the storage and retrieval of the information to and from storage devices 118 in accordance with input/output (I/O) operations. When accessing a block of a file in response to servicing a client request, the file system specifies a VBN that is translated at the file system/RAID system boundary into a disk block number ("DBN") (or PVBN) location on a particular storage device (storage device, DBN) within a RAID group of the physical volume). Each block in the VBN space and in the DBN space maybe fixed, e.g., 4 k bytes (kB), in size; accordingly, there is typically a one-to-one mapping between the information stored on the storage devices in the DBN space and the information organized by the file system in the VBN space.

A requested block is retrieved from one of the storage devices 118 and stored in a buffer cache (e.g. 512, FIG. 5) of a memory of the storage system 108 as part of a buffer tree (e.g. 400, FIG. 4) of the file. The buffer tree is an internal representation of blocks for a file stored in the buffer cache 512 and maintained by the file system. Broadly stated and as described below in detail, the buffer tree has an inode at the root (top-level) of the file.

An inode is a data structure used to store information, such as metadata, about a file, whereas the data blocks are structures used to store the actual data. for the file. The information in an inode may include, e.g., ownership of the file, file modification time, access permission for the file, size of the file, file type and references to locations on storage devices 118 of the data blocks for the file. The references to the locations of the file data are provided by pointers, which may further reference indirect blocks (e.g. 404, FIG. 4) that, in turn, reference the data. blocks (e.g. 406, FIG. 4), depending upon the amount of data in the file. Each pointer may be embodied as a VBN to facilitate efficiency among the file system and the RAID system when accessing the data.

Volume information ("volinfo") and file system information ("fsinfo") blocks specify the layout of information in the file system, the latter block including an inode of a file that includes all other inodes of the file system (the inode file). Each logical volume has an fsinfo block that is preferably stored at a fixed location, e.g., at a RAID group. The inode of the fsinfo block may directly reference (or point to) blocks of the inode file or may reference indirect blocks of the inode file that, in turn, reference direct blocks of the inode file. Within each direct block of the inode file are embedded inodes, each of which may reference indirect blocks that, in turn, reference data blocks (also mentioned as "L0" blocks) of a file. An example of an inode and a buffer tree are described below with respect to FIG. 4.

In a typical mode of operation, a computing device (e.g. host system 102, client 116 or any other device) transmits one or more I/O requests over connection system 110 to the storage system 108. Storage system 108 receives the I/O requests, issues one or more I/O commands to storage devices 118 to read or write data on behalf of the computing device, and issues a response containing the requested data over the network 110 to the respective client system.

As mentioned above, system 100 may also include a virtual machine environment where a physical resource is time-shared among a plurality of independently operating processor executable virtual machines (VMs). Each VM may function as a self-contained platform, running its own operating system (OS) and computer executable application software. The computer executable instructions running in a VM may be collectively referred to herein as "guest software." In addition, resources available within the VM may be referred to herein as "guest resources."

The guest software expects to operate as if it were running on a dedicated computer rather than in a VM. That is, the guest software expects to control various events and have access to hardware resources on a physical computing system (may also be referred to as a host system), which may be referred to herein as "host hardware resources". The host hardware resources may include one or more processors, resources resident on the processors (e.g., control registers, caches and others), memory (instructions residing in memory, e.g., descriptor tables), and other resources (e.g., input/output devices, host attached storage, network attached storage or other like storage) that reside in a physical machine or are coupled to the host system.

As shown in FIG. 1, host system 102A includes/provides a virtual machine environment executing a plurality of VMs 130A-130N (may also be referred to as VM 130 or VMs 130) that may be presented to client computing devices/ systems 116A-116N. VMs 130 execute a plurality of guest OS 104A-104N (may also be referred to as guest OS 104) that share hardware resources 128. Application 126 may also be executed within VMs 130 to access the storage system 108. As described above, hardware resources 128 may include storage, CPU, memory, I/O devices or any other hardware resource.

In one aspect, host system 102A interfaces with or includes a virtual machine monitor (VMM) 106, for example, a processor executed Hyper-V layer provided by Microsoft Corporation of Redmond, Wash., a hypervisor layer provided by VMWare Inc., or any other type (without derogation of any third party trademark rights). VMM 106 presents and manages the plurality of guest OS 104A-104N executed by the host system 102A. The VMM 106 may include or interface with a virtualization layer (VIL) 122 that provides one or more virtualized hardware resource to each OS 104A-104N.

In one aspect, VMM 106 is executed by host system 102A with VMs 130. In another aspect, VMM 106 may be executed by an independent stand-alone computing system, referred to as a hypervisor server or VMM server and VMs 130 are presented at one or more computing systems.

It is noteworthy that different vendors provide different virtualization environments, for example, VMware Inc., Microsoft Corporation and others. Data centers may have hybrid virtualization environments/technologies, for example, Hyper-V and hypervisor based virtual environments. The generic virtualization environment described above with respect to FIG. 1 may be customized to implement the various aspects of the present disclosure. Furthermore, VMM 106 (or VIL 122) may execute other modules, for example, a storage driver, network interface and others. The virtualization environment may use different hardware and software components and it is desirable for one to know an optimum/compatible configuration.

In one aspect, system 100 uses a management console 132 for configuring and managing the various components of system 100. As an example, the management console 132 may be implemented as or include one or more application programming interfaces (APIs) that are used for managing one or more components of system 100. The APIs may be implemented as REST APIs, where REST means "Representational State Transfer". REST is a scalable system used for building web services. REST systems/interfaces may use HTTP (hyper-text transfer protocol) or other protocols for communicating with one or more devices of system 100.

Although storage system 108 is shown as a stand-alone system, i.e. as a non-cluster based system, in another aspect, storage system 108 may have a distributed architecture, for example, a cluster based storage system.

Storage Operating System

Figure 2:
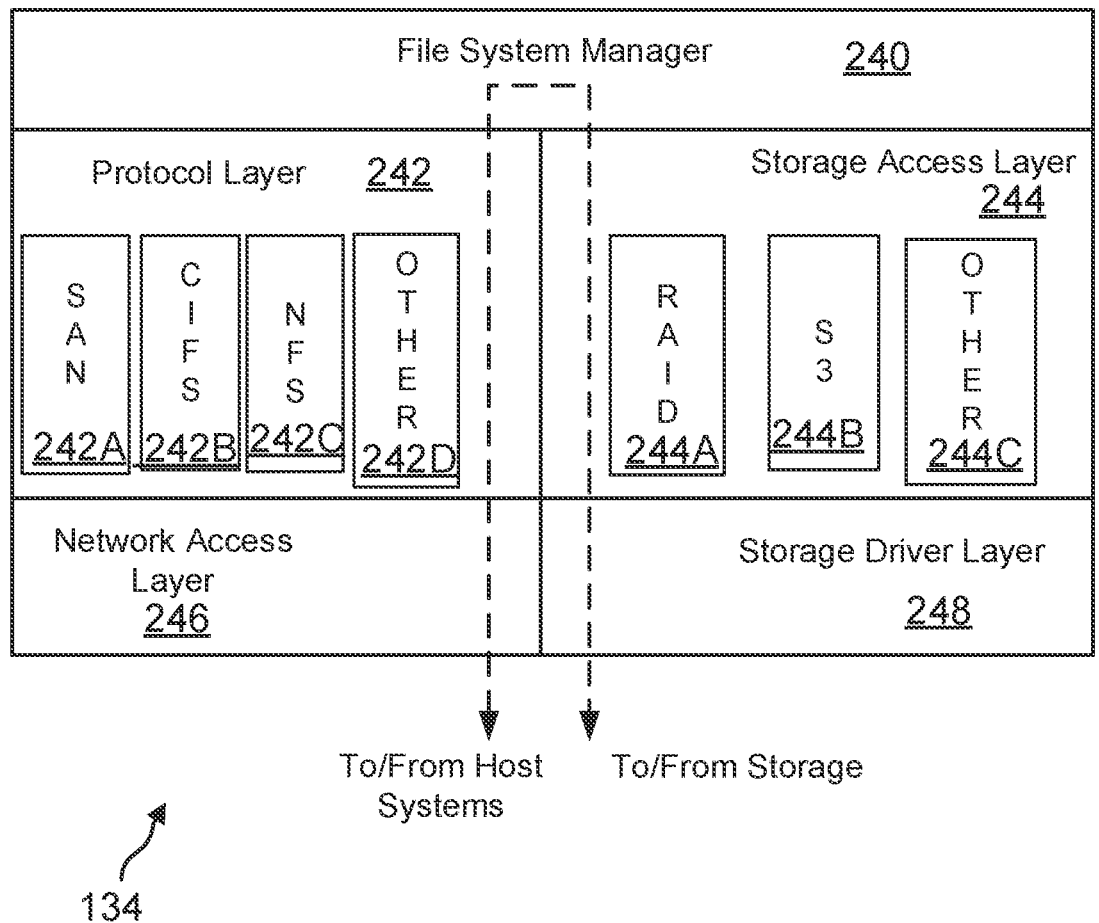
FIG. 2 shows an example of a storage operating system executed by a storage system, according to aspects of the present disclosure.

FIG. 2 illustrates a generic example of the storage operating system 134 of FIG. 1 executed by the storage system 108, according to one aspect of the present disclosure. In one example, storage operating system 134 may include several modules, or "layers" executed by the storage system 108. These layers include a file system manager (also referred to as a file system throughout this specification) 240 that keeps track of a hierarchical structure for data stored in storage devices 118 and manages read/write operation, i.e. executes read/write operation on storage in response to I/O requests, as described below in detail.

Storage operating system 134 may also include a protocol layer 242 and an associated network access layer 246, to allow the storage system 108 to communicate over a network with other systems, such as clients 116. Protocol layer 242 may implement one or more of various higher-level network protocols, such as SAN (e.g. iSCSI) (242A), CIFS (242B), NFS (242C), Hypertext Transfer Protocol (HTTP) (not shown), TCP/IP (not shown) and others (242D). The network access layer 246 may include one or more drivers, which implement one or more lower-level protocols to communicate over the network, such as Ethernet. Interactions between host systems and mass storage devices are illustrated schematically as a path, which illustrates the flow of data through storage operating system 134.

The storage operating system 134 may also include a storage access layer 244 and an associated storage driver layer 248 to allow storage system 108 to communicate with a storage device. The storage access layer 244 may implement a higher-level storage protocol, such as RAID (244A), a S3 layer 244B to access a capacity tier for object-based storage (not shown), and other layers 244C. The storage driver layer 248 may implement a lower-level storage device access protocol, such as Fibre Channel or SCSI. The storage driver layer 248 may maintain various data structures (not shown) for storing information regarding storage volume, aggregate and various storage devices.

As used herein, the term "storage operating system" generally refers to the computer-executable code operable on a computer to perform a storage function that manages data access and may, in the case of a storage system node, implement data access semantics of a general-purpose operating system. The storage operating system can also be implemented as a microkernel, an application program operating over a general-purpose operating system, such as UNIX® or Windows®, or as a general-purpose operating system with configurable functionality, which is configured for storage applications as described herein.

In addition, it will be understood to those skilled in the art that the disclosure described herein may apply to any type of special-purpose (e.g., file server, filer or storage serving appliance) or general-purpose computer, including a stand-alone computer or portion thereof, embodied as or including a storage system. Moreover, the teachings of this disclosure can be adapted to a variety of storage system architectures including, but not limited to, a network-attached storage environment, a storage area network and a storage device directly attached to a client or host computer. The term "storage system" should therefore be taken broadly to include such arrangements in addition to any subsystems configured to perform a storage function and associated with other equipment or systems. It should be noted that while this description is written in terms of a write any-where file system, the teachings of the present disclosure may be utilized with any suitable file system, including a write in place file system.

Inode Structure

Figure 3:
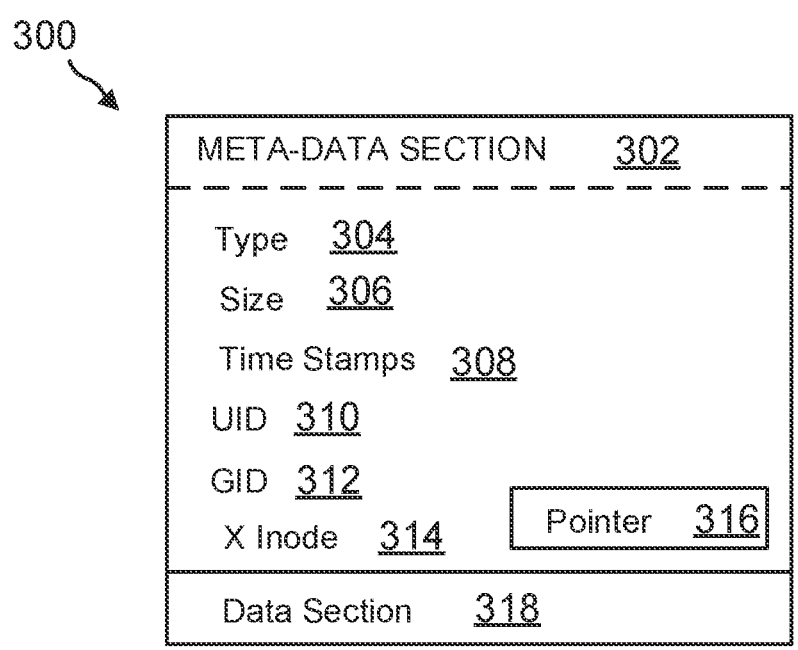
FIG. 3 shows an example of an "inode" used by the storage system for storing and retrieving data from a storage device, according to aspects of the present disclosure.

FIG. 3 shows an example of an inode structure 300 (may also be referred to as inode 300) used to store data on storage devices 118 of the storage subsystem 112, according to one aspect of the present disclosure. Inode 300 may include a meta-data section 302 and a data section 318. The information stored in the meta-data section 302 of each inode 300 describes a file and, as such, may include the file type (e.g., regular, directory or object) 304, size 306 of the file, time stamps (e.g., access and/or modification time) 308 for the file and ownership, i.e., user identifier (UID 310) and group ID (GID 312), of the file. The metadata section 302 may also include an X-inode field 314 with a pointer 316 that references another on-disk inode structure containing, e.g., access control list (ACL) information associated with the file or directory.

The contents of data section 318 of each inode 300 may be interpreted differently depending upon the type of file (inode) defined within the type field 304. For example, the data section 318 of a directory inode structure includes meta-data controlled by the file system, whereas the data section of a "regular inode" structure includes user-defined data. In the latter case, the data section 318 includes a representation of the data associated with the file. Data section 318 of a regular on-disk inode file may include user data or pointers, the latter referencing, for example, data blocks for storing user data at a storage device.

Inode structure 300 may have a restricted size (for example, 122 bytes). Therefore, user data having a size that is less than or equal to 64 bytes may be represented, in its entirety, within the data section of an inode. However, if the user data is greater than 64 bytes but less than or equal to, for example, 64 kilobytes (KB), then the data section of the inode comprises multiple pointers, e.g. 16 pointers, each of which references a block of data stored at a disk. Moreover, if the size of the data is greater than 64 kilobytes but less than or equal to 64 megabytes (MB), then each pointer in the data section 318 of the inode references an indirect inode that contains multiple pointers (e.g. 1024 pointers), each of which references a data block on disk.

Buffer Tree

Figure 4:
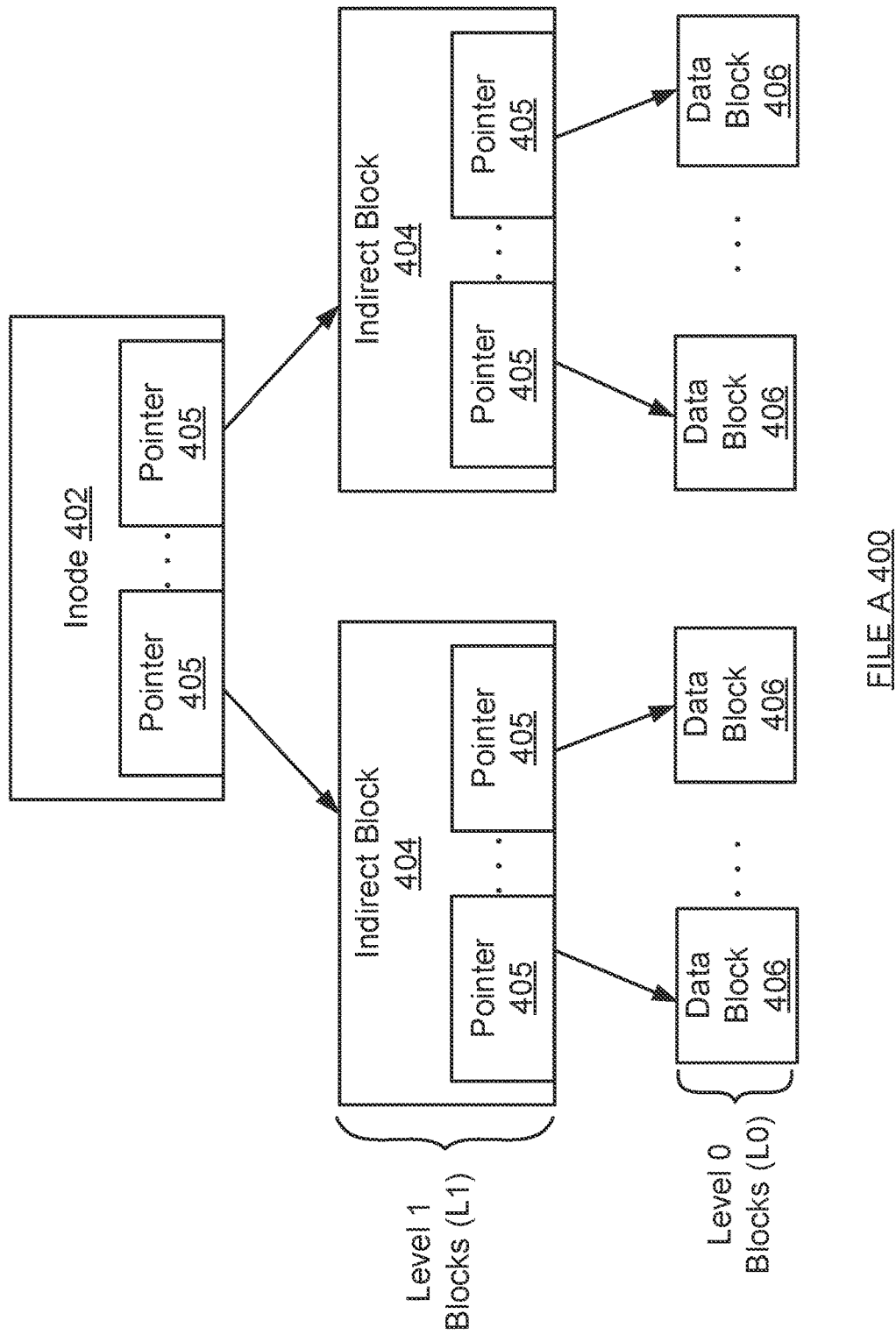
FIG. 4 shows an example of a buffer tree used by the storage operating system of the storage system, according to aspects of the present disclosure.

FIG. 4 is an example of an inode buffer tree of a data container that may be used by the storage operating system 134. The buffer tree is an internal representation of blocks for a data container (e.g., file A 400) loaded into the buffer cache 512 (e.g., of a storage system 108) and maintained by the file system manager 240. A root (top-level) inode 402, such as an embedded inode, references indirect blocks 404 (e.g., Level 1). The root inode 402 may be referenced by a fsinfo block.

The indirect blocks (and inode) contain pointers 405 that ultimately reference data blocks 406 used to store the actual data of file A 400. That is, the data of file A 400 are contained in data blocks and the locations of these blocks are stored in the indirect blocks of the file. Each Level 1 indirect block 404 may contain pointers to a plurality of data blocks. Each L1 block has a fixed span: a fixed number of entries, each pointing to another block in the tree.

In one aspect, the file system manager 240 allocates blocks, and frees blocks, to and from a virtual volume (may be referred to as VVOL) of an aggregate. The aggregate, as mentioned above, is a physical volume comprising one or more groups of storage devices, such as RAID groups, underlying one or more VVOLs of the storage system. The aggregate has its own PVBN space and maintains metadata, such as block allocation bitmap structures, within that PVBN space. Each VVOL also has its own VVBN space and maintains metadata, such as block allocation bitmap structures, within that VVBN space. Typically, PVBNs are used as block pointers within buff& trees of files (such as file 400) stored in a VVOL.

As an example, a VVOL may be embodied as a container file in an aggregate having L0 (data) blocks that comprise all blocks used to hold data in a VVOL; that is, the L0 data blocks of the container file contain all blocks used by a VVOL. L1 (and higher) indirect, blocks of the container file reside in the aggregate and, as such, are considered aggregate blocks. The container file is an internal (to the aggregate) feature that supports a VVOL; illustratively, there is one container file per VVOL. The container file is a hidden file (not accessible to a user) in the aggregate that holds every block in use by the VVOL.

To compress data at a container file layer, multiple data blocks of data are combined in a group, and then this combined group of data is compressed using a compression algorithm. The compressed data is then stored within the storage blocks. The storage blocks where the compressed data is stored for a group of container file blocks may be referred to as a CDE, as described above. The group of blocks on the container file points to the CDE in the file system indirect block metadata. When operating in a VVOL, VVBN identifies an FBN location within the file and the file system uses the indirect blocks of the hidden container file to translate the FBN into a PVBN location within the physical volume, which block can then be retrieved from storage 118.

File System Manager 240

Figure 5:
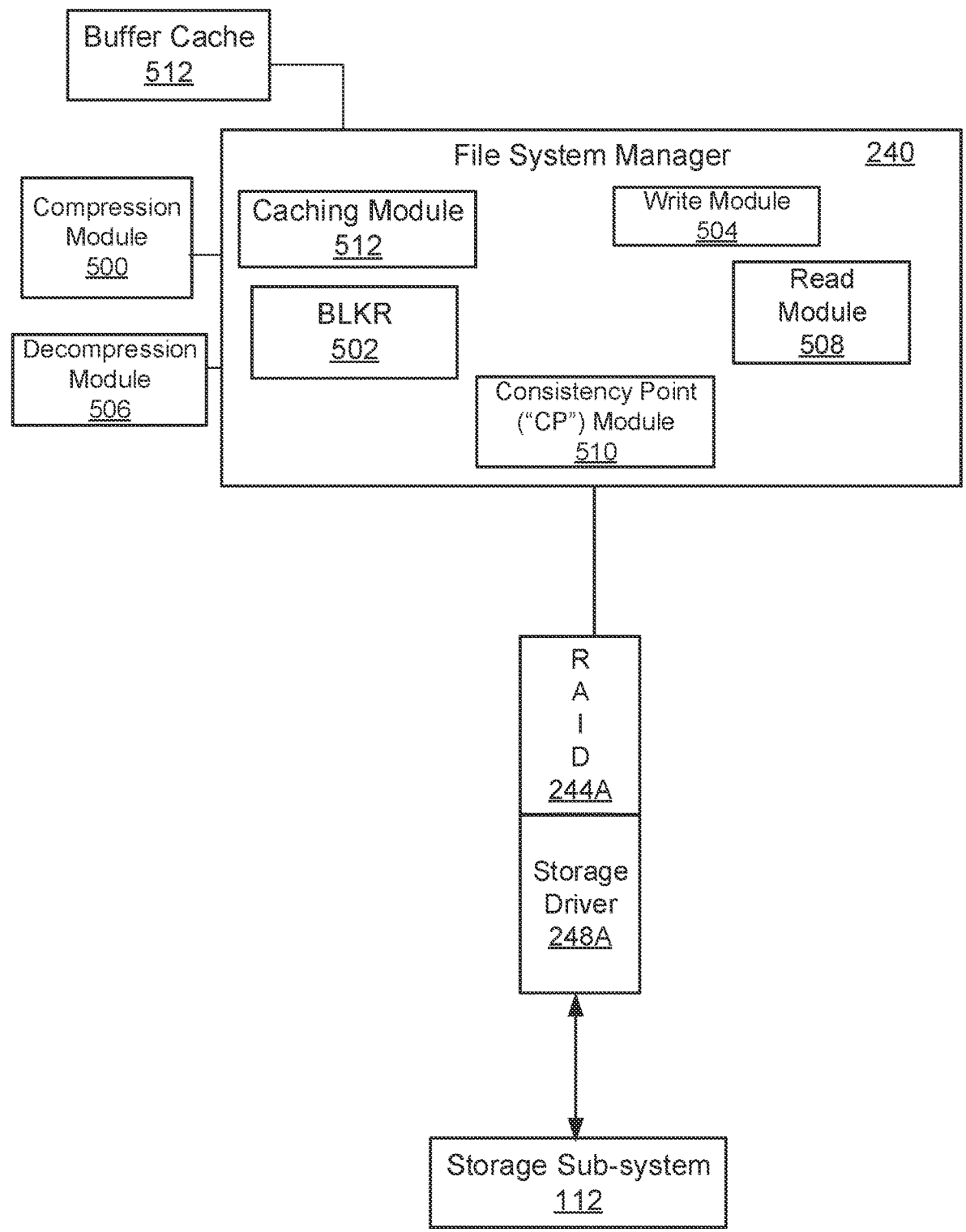
FIG. 5 shows a block diagram illustrating an example of various components of a file system manager of the storage operating system, according to aspects of the present disclosure.

FIG. 5 shows a block diagram of the file system manager 240 (first introduced with respect to FIG. 2), according to one aspect of the present disclosure. The file system manager 240 includes a write module 504 that manages write requests for writing data in storage device 118 (FIG. 1) and a read module 508 that manages read requests for reading data from storage devices 118. The write module 504 may include a write allocator sub-module (not shown) that allocates storage space/blocks for storing data. The write allocator maintains a list of free blocks that may be used by a storage node for writing data. The write allocator may predict what storage blocks may get written at any given time, based on a pattern of write requests. For example, for requests from a certain source to write large amount of data, the write allocator will predict larger storage space and blocks for storing data. For requests to write smaller files, the write allocator predicts smaller storage space. Since the write module 504 is aware of the write requests at any given time, it can predict where data maybe written soon.

The buffer cache 512 is managed by a caching module 512. A consistency point (CP) module 510 is used to manage CP operations to flush data from the buffer cache 512 to persistent storage (e.g. storage devices 118). In one aspect, when data is to be persistently stored, the data buffers are marked as dirty at the buffer cache 512, and then the CP module 510 flushes the dirty buffer data from the buffer cache 512 to the storage subsystem 112 storage devices 118.

The read module 508 is used to fetch data from the storage devices 118 at the storage subsystem 112 in response to read requests. The RAID layer 244A using a storage driver 248A, for example a Fibre Channel driver, is used to access the storage devices 118 at the storage subsystem 112 to retrieve the requested data and present. the data to an application that requested the data.

In one aspect, the file system manager 240 also includes or interfaces with a block reallocation module ("BLKR") 502, a file system scanner that detects and repairs fragmentation in a PVBN space of an aggregate, as described below. The fragmentation may occur because the file system manager 240 writes data "anywhere" in the PVBN space and over time stored data can get fragmented across the PVBN space. The BLKR 502 interacting with other modules including the RAID layer 244A defragments PVBN space, as described below in detail.

In one aspect, the file system. manager 240 interfaces with a compression module 500 to compress data and a decompression module 506 that decompresses data. Both the compression module 500 and the decompression module 506 operate outside the file system manager 240. A fragmented PVBN space may store CDEs. In conventional systems, to defragment the PVBN space, a file system typically decompresses and then compresses CDEs. The compressed CDEs are then stored in newly allocated blocks that are assigned to defragment the PVBN space. The decompression and compression operations consume computing resources, e.g., processor cycles and memory usage. The adaptive aspects of the present disclosure provide innovative technical solutions to address this challenge of conventional systems and improve overall computing defragmentation technology, as described below.

Process Flows

Figure 6A:
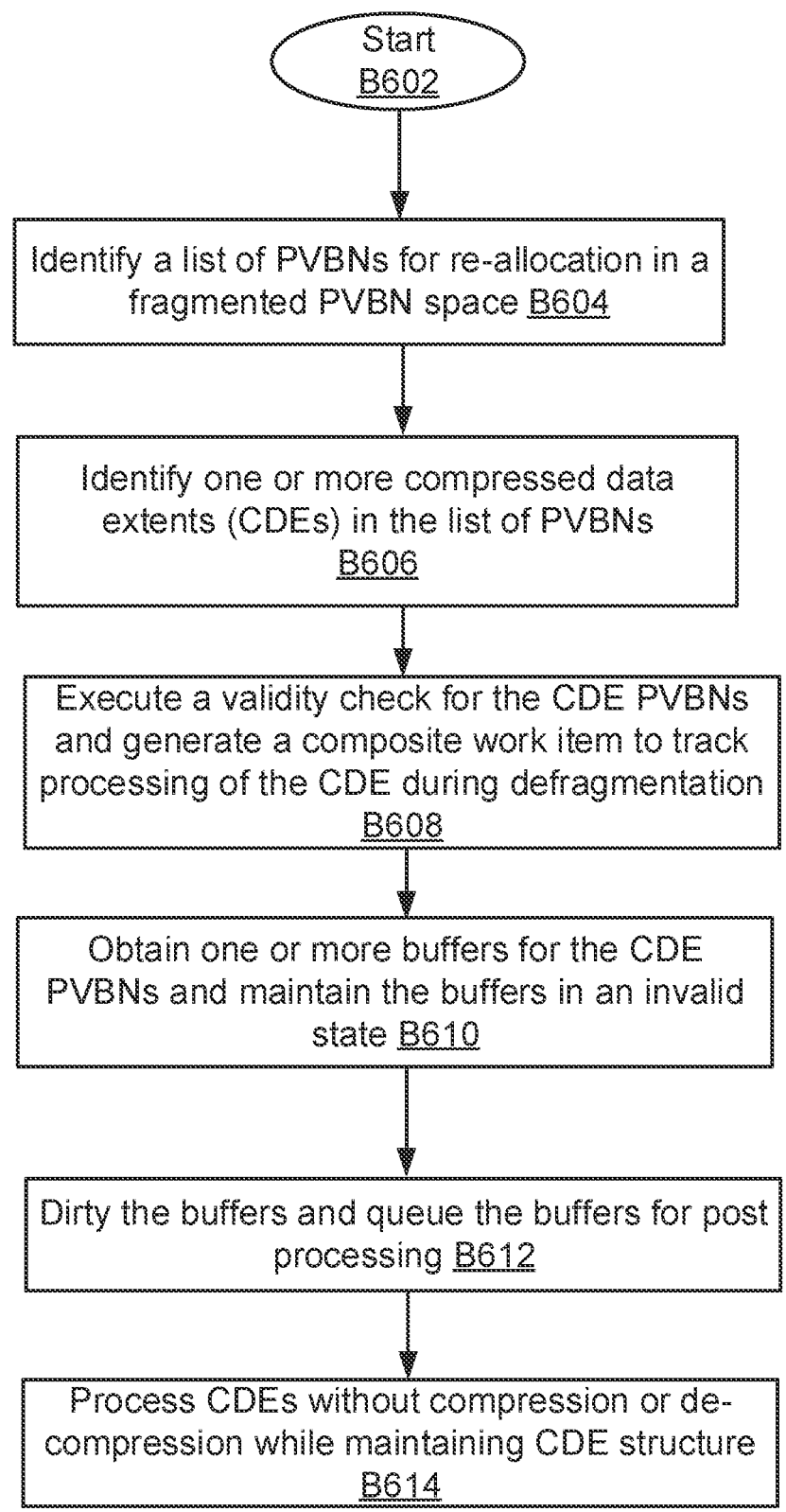
FIG. 6A shows an example of a defragmentation process for re-allocating blocks, according to aspects of the present disclosure.

FIG. 6A shows a process 600 that enables defragmentation of a PVBN space storing CDE extents, while maintaining the overall CDE structure, without having to decompress and/or re-compress the CDEs at PVBN blocks allocated to alleviate fragmentation. At a high level, in process 600, BLKR 502 identifies a list of PVBNs that have to be reallocated due to fragmentation. BLKR 502 determines that the list of PVBNs includes one or more CDEs. The process performs a validity check to ensure that the L1 blocks of the CDEs are still pointing to the same CDE PVBNs. Composite work items are generated for each CDE for copying the CDE "as-is" i.e., without decompression. The process obtains one or more buffers for the L0 blocks associated with each CDE PVBN and the buffers are maintained in an "invalid state." It is noteworthy that the buffers are write allocated in an invalid state, which enables copying the CDEs without decompression. Note that any internal subsystem of the file system manager 240 as shown in FIG. 5, which tries to load the invalid dirty buffers is suspended until write allocation is completed because valid decompressed data is unavailable. The buffers are then "dirtied" and queued for post processing. The packed CDEs are then processed during a consistency point. The CDE context and structure is maintained during defragmentation.

Referring now to FIG. 6A in detail, process 600 begins in block B602. BLKR 502 scans the PVBN space having data blocks. Based on the distribution of the data blocks within the PVBN, BLKR 502 determines that the PVBN space is fragmented. BLKR 502 identifies a list of PVBN in block B604. The list of PVBNs identifies each PVBN/LO block that has to be re-allocated to de-fragment the PVBN space.

In block B606, BLKR 502 identifies one or more CDEs in the list of PVBNs. In one aspect, the metadata section 302 described above with respect to FIG. 3, may include a flag indicating that the list of PVBNs includes a CDE.

In block B608, the BLKR 502 executes a validity check for the identified CDE(s). During the validity check, BLKR 502 confirms that the L1 pointers for the identified CDE (s) still point to the same PVBNs in the identified list.

Figure 6B:
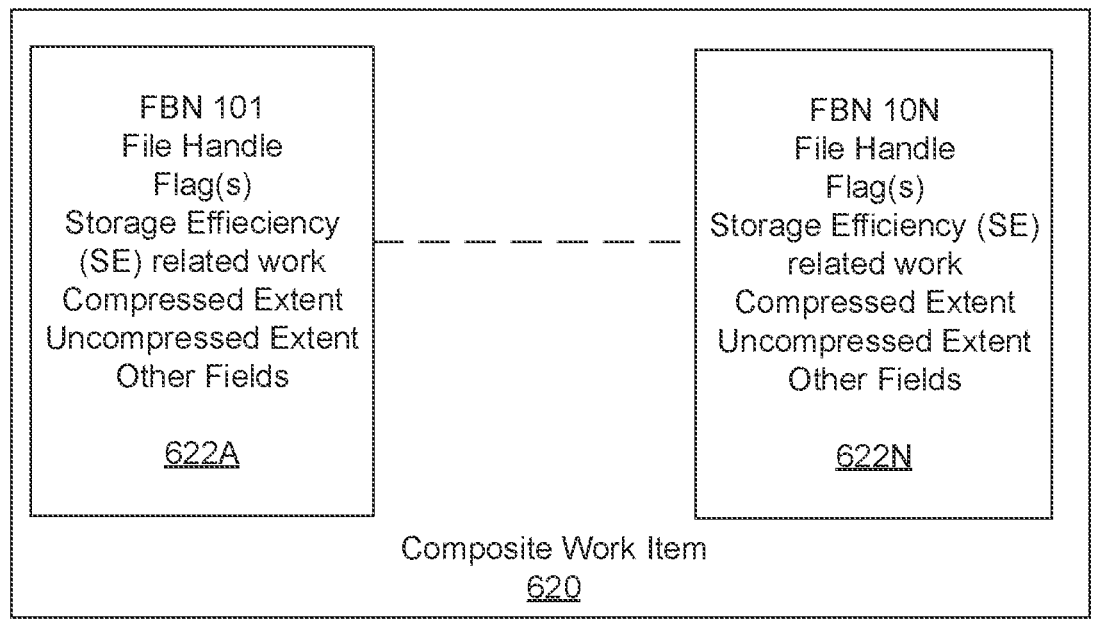
FIG. 6B shows an example of a composite work item, generated according to aspects of the present disclosure.

In response to a successful validity check, a composite work item for the identified CDE(s) is generated. The composite work item is used to efficiently track CDE processing during process 600. In one aspect, FIG. 6B shows an example of a composite work item 620 that includes a plurality of linked work items 622A-622N (may also be referred to as work item 622 or work items 622). Each linked work item 622 represents a block FBN (e.g., 101-10N), a file handle, any flags, e.g., indicating success or failure of a task, an indicator indicating the work that is needed for storage efficiency (e.g., deduplication/compression/decompression, if needed), a compressed extent that holds compressed data for packing using re-allocated blocks, an uncompressed extent that holds decompressed data in case of a failure and other fields. The composite work item 620 can be accessed from any domain i.e. the file system manager 240 or systems operating outside the storage operating system 134.

In block B610, one or more memory buffers are obtained for the CDE PVBNs. The buffers are maintained in an invalid state. The buffers are dirtied and then queued for post processing in block B612. Thereafter, in block B614, during a consistency point operation, the CDE is processed i.e. packed in the newly allocated PVBNs without compression or decompression, while maintaining the CDE structure. Because the CDE is processed without decompression and compression, computing resources are used more efficiently.

It is noteworthy that if the validity check fails in block B608, then the process uses the decompression module 506 to decompress the compressed data. The decompressed data is then compressed by the compression module 500 for packing at the newly allocated PVBNs. The composite work item 620 can still be used for processing the CDE.

Figure 6C:
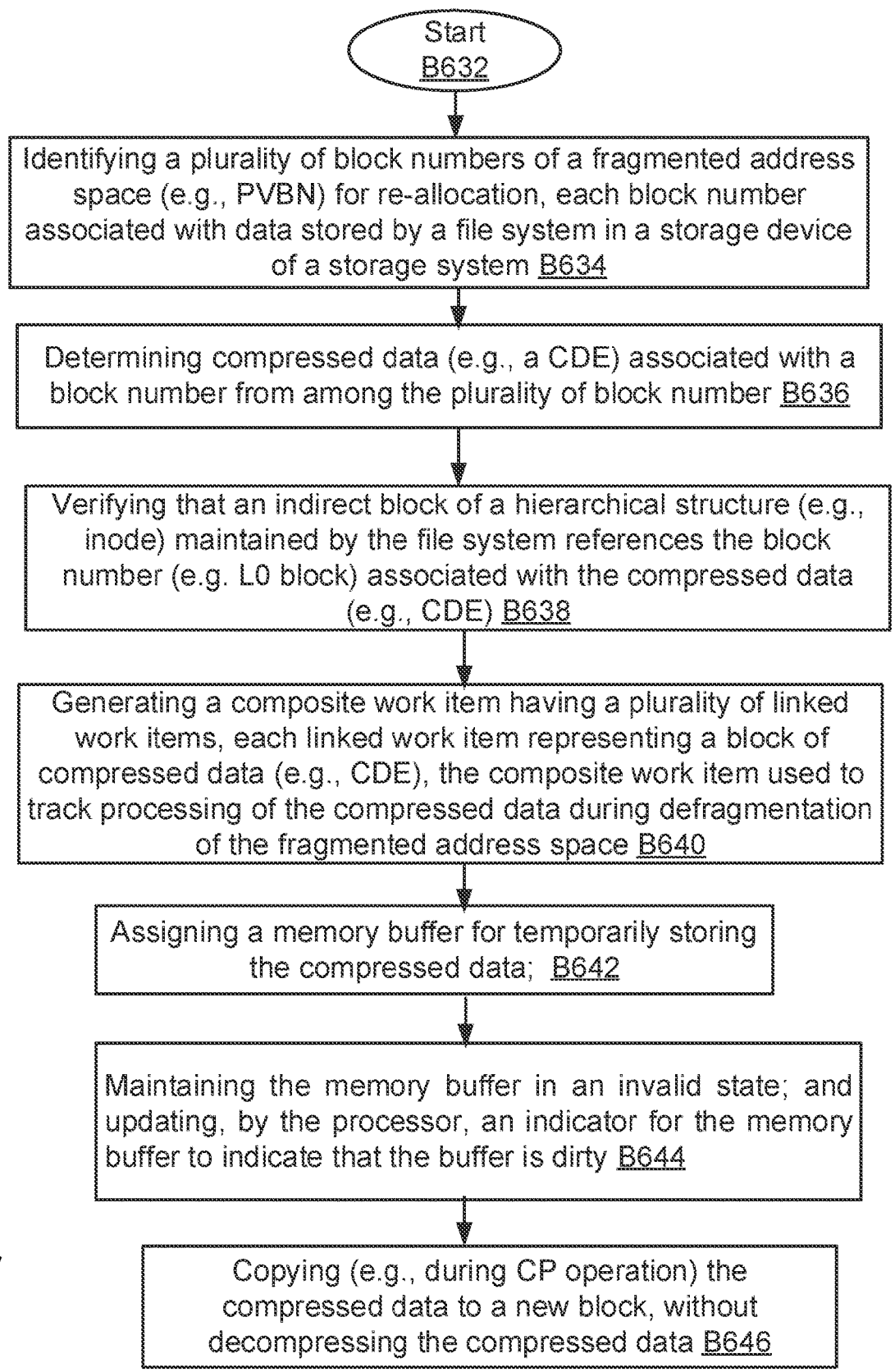
FIG. 6C shows another defragmentation process for re-allocating blocks, according to aspects of the present disclosure.

FIG. 6C shows another process 630 executed by a processor (e.g., 702, FIG. 7) of storage system 108, according to one aspect of the present disclosure. Process 630 begins in block B632, when BLKR 502 scans the PVBN space having data blocks. Based on the distribution of the data blocks within the PVBN address space, BLKR 502 determines that the PVBN space is fragmented. In block B634, BLKR 502 identifies a plurality of block numbers (e.g., PVBNs) of a fragmented address space (e.g., PVBN space) for re-allocation, each block number associated with data stored by a file system (240, FIG. 5) in a storage device (118, FIG. 1) of a storage system (100, FIG. 1).

In block B636, BLKR 502 determines compressed data (e.g., one or more CDEs) associated with one or more block numbers from among the plurality of block numbers.

In block B638, BLKR 502 verifies that an indirect block (404, FIG. 4) of a hierarchical structure (400, FIG. 4) maintained by the file system 240 references the block number associated with the compressed data (e.g., a CDE).

In block B640, a composite work item (e.g., 620, FIG. 6B) having a plurality of linked work items (e.g., 622A-622N) is generated. Each linked work item represents a block of compressed data. the composite work item is used to track processing of the compressed data during defragmentation of the fragmented address space.

In block B642, a memory buffer is assigned for temporarily storing the compressed data. In block B644, the memory buffer is maintained in an invalid state; and an indicator associated with the memory buffer is updated to indicate that the buffer is dirty.

In block B646, the compressed data is copied to a new block, without decompressing the data. In one aspect, the compressed data from the memory buffer is transferred to the storage device during a consistency point operation. No decompression is performed and the overall CDE structure and context is maintained.

In another aspect, the method 630 may include decompressing the compressed CDE, in response to the indirect block not referencing the block number; and then compressing the decompressed data, for persistently storing the compressed data, when the verification of block B638 fails.

Processing System

Figure 7:
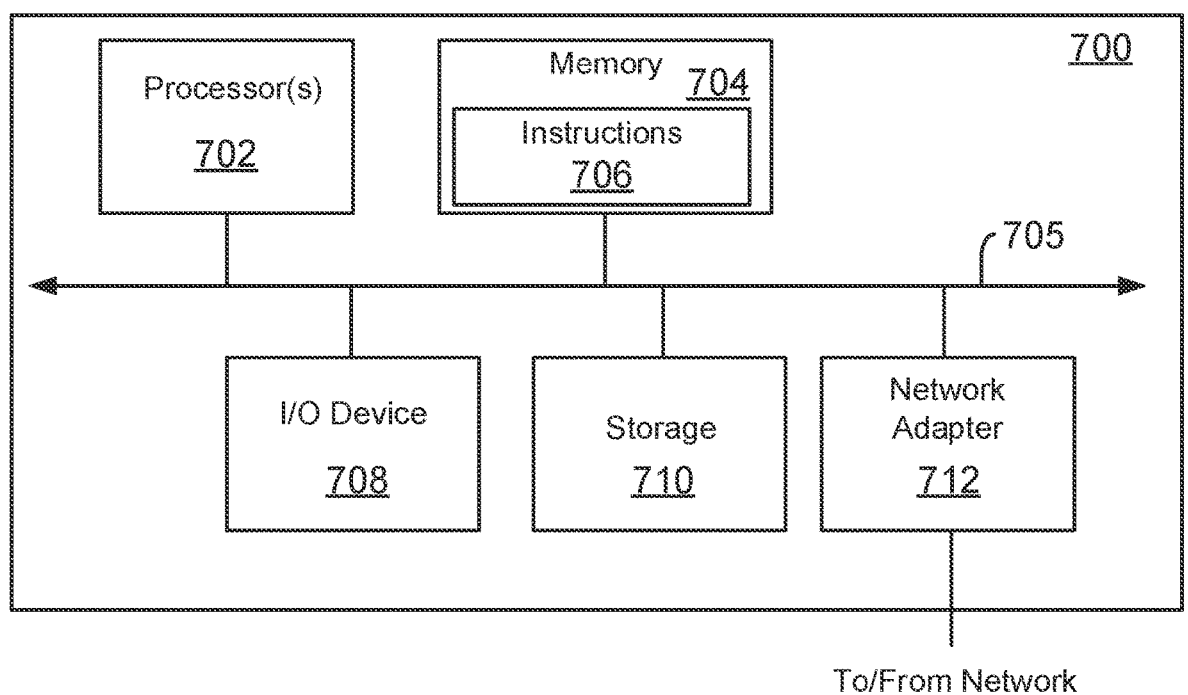
FIG. 7 shows an example of a processing system, used according to aspects of the present disclosure.

FIG. 7 is a high-level block diagram showing an example of the architecture of a processing system 700 that may be used according to one aspect. The processing system 700 can represent the storage system node 108, host system 102, management console 132, or clients 116, 204. Note that certain standard and well-known components which are not germane to the present aspects are not shown in FIG. 7.

The processing system 700 includes one or more processor(s) 702 and memory 704, coupled to a bus system 705. Memory 704 may include the buffer cache 512 described above with respect to FIG. 5. The bus system 705 shown in FIG. 7 is an abstraction that represents any one or more separate physical buses and/or point-to-point connections, connected by appropriate bridges, adapters and/or controllers. The bus system 705, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire").

The processor(s) 702 are the central processing units (CPUs) of the processing system 700 and, thus, control its overall operation. In certain aspects, the processors 702 accomplish this by executing software stored in memory 704. The processors 702 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 704 represents any form of random-access memory (RAM), read-only memory (ROM), flash memory, or the like, or a combination of such devices. Memory 704 includes the main memory of the processing system 700. Instructions 706 may be used to implement the process steps of FIG. 6A and 6C, as well as the composite work items of FIG. 6B/described above, may reside in and executed (by processors 702) from memory 704.

Also connected to the processors 702 through the bus system 705 are one or more internal mass storage devices 710, and a network adapter 712. Internal mass storage devices 710 may be or may include any conventional medium for storing large volumes of data in a non-volatile manner, such as one or more magnetic or optical based disks, solid state drives, or any other storage media. The network adapter 712 provides the processing system 700 with the ability to communicate with remote devices (e.g., storage servers) over a network and may be, for example, an Ethernet adapter, a Fibre Channel adapter, or the like.

The processing system 700 also includes one or more input/output (I/O) devices 708 coupled to the bus system 705. The I/O devices 708 may include, for example, a display device, a keyboard, a mouse, etc.

Cloud Computing

The system and techniques described above are applicable and useful in the cloud computing environment. Cloud computing means computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. The term "cloud" is intended to refer to the Internet and cloud computing allows shared resources, for example, software and information to be available, on-demand, like a public utility.

Typical cloud computing providers deliver common business applications online which are accessed from another web service or software like a web browser, while the software and data are stored remotely on servers. The cloud computing architecture uses a layered approach for providing application services. A first layer is an application layer that is executed at client computers. In this example, the application allows a client to access storage via a cloud. After the application layer, is a cloud platform and cloud infrastructure, followed by a "server" layer that includes hardware and computer software designed for cloud specific services, for example, the storage system 108 is accessible as a cloud service. Details regarding these layers are not germane to the embodiments disclosed herein.

Thus, methods and systems for efficiently managing block reallocation in a networked storage environment have been described. Note that references throughout this specification to "one aspect" (or "embodiment") or "an aspect" mean that a particular feature, structure or characteristic described in connection with the aspect is included in at least one aspect of the present disclosure. Therefore, it is emphasized and should be appreciated that two or more references to "an aspect" or "one aspect" or "an alternative aspect" in various portions of this specification are not necessarily all referring to the same aspect. Furthermore, the particular features, structures or characteristics being referred to may be combined as suitable in one or more aspects of the disclosure, as will be recognized by those of ordinary skill in the art.

While the present disclosure is described above with respect to what is currently considered its preferred aspects, it is to be understood that the disclosure is not limited to that described above. To the contrary, the disclosure is intended to cover various modifications and equivalent arrangements within the spirit and scope of the appended claims.

What is claimed is:

1. A method, comprising:
   identifying, by a processor, a plurality of block numbers of a fragmented address space for re-allocation, each block number associated with data stored by a file system in a storage device of a storage system;
   determining, by the processor, compressed data associated with a block number from among the plurality of block numbers;
   verifying, by the processor, that an indirect block of a hierarchical structure maintained by the file system references the block number associated with the compressed data; and
   copying, by the processor, the compressed data to a new block, without decompressing the data.

2. The method of claim 1, further comprising:
   assigning, by the processor, a memory buffer for temporarily storing the compressed data.

3. The method of claim 2, further comprising:
   maintaining, by the processor, the memory buffer in an invalid state; and
   updating, by the processor, an indicator of the memory buffer to indicate that the buffer is dirty.

4. The method of claim 3, further comprising:
   transferring, by the processor, the compressed data from the memory buffer to the storage device during a consistency point operation.

5. The method of claim 1, further comprising:
   decompressing, by the processor, the compressed data, in response to the indirect block not referencing the block number.

6. The method of claim 5, further comprising:
compressing, by the processor, the decompressed data, for persistently storing the compressed data.

7. The method of claim 1, further comprising:
generating, by the processor, a composite work item having a plurality of linked work items, each linked work item representing a block of compressed data, the composite work item used to track processing of the compressed data during defragmentation of the fragmented address space.

8. A non-transitory, machine readable storage medium having stored thereon instructions comprising machine executable code, which when executed by a machine, causes the machine to:
identify a plurality of block numbers of a fragmented address space for re-allocation, each block number associated with data stored by a file system in a storage device of a storage system;
determine compressed data associated with a block number from among the plurality of block numbers;
verify that an indirect block of a hierarchical structure maintained by the file system references the block number associated with the compressed data; and
copy the compressed data to a new block, without decompressing the data.

9. The non-transitory, machine readable storage medium of claim 8, wherein the machine executable code further causes the machine to:
assign a memory buffer for temporarily storing the compressed data.

10. The non-transitory, machine readable storage medium of claim 8, wherein the machine executable code further causes the machine to:
maintain the memory buffer in an invalid state; and
update an indicator of the memory buffer to indicate that the buffer is dirty.

11. The non-transitory, machine readable storage medium of claim 10, wherein the machine executable code further causes the machine to:
transfer the compressed data from the memory buffer to the storage device during a consistency point operation.

12. The non-transitory, machine readable storage medium of claim 8, wherein the machine executable code further causes the machine to:
decompress the compressed data, in response to the indirect block not referencing the block number; and
compress the decompressed data, for persistently storing the compressed data.

13. The non-transitory, machine readable storage medium of claim 8, wherein the machine executable code further causes the machine to:
generate a composite work item having a plurality of linked work items, each linked work item representing a block of compressed data, the composite work item used to track processing of the compressed data during defragmentation of the fragmented address space.

14. A system, comprising:
a memory containing machine readable medium comprising machine executable code having stored thereon instructions; and
a processor coupled to the memory to execute the machine executable code to:
identify a plurality of block numbers of a fragmented address space for re-allocation, each block number associated with data stored by a file system in a storage device of a storage system;
determine compressed data associated with a block number from among the plurality of block numbers;
verify that an indirect block of a hierarchical structure maintained by the file system references the block number associated with the compressed data; and
copy the compressed data to a new block, without decompressing the data.

15. The system of claim 14, wherein the machine executable code further causes to:
assign a memory buffer for temporarily storing the compressed data.

16. The system of claim 14, wherein the machine executable code further causes to:
maintain the memory buffer in an invalid state; and
update an indicator of the memory buffer to indicate that the buffer is dirty.

17. The system of claim 14, wherein the machine executable code further causes to:
transfer the compressed data from the memory buffer to the storage device during a consistency point operation.

18. The system of claim 14, wherein the machine executable code further causes to:
decompress the compressed data, in response to the indirect block not referencing the block number.

19. The system of claim 18, wherein the machine executable code further causes to:
compress the decompressed data, for persistently storing the compressed data.

20. The system of claim 14, wherein the machine executable code further causes to:
generate a composite work item having a plurality of linked work items, each linked work item representing a block of compressed data, the composite work item used to track processing of the compressed data during defragmentation of the fragmented address space.

* * * * *